United States Patent [19]

Nicolet et al.

[11] 3,891,723

[45] June 24, 1975

[54] EMULSION POLYMERIZATION OF VINYL CHLORIDE, AND A COPOLYMER OF α-METHYL STYRENE AND ACRYLIC ACID ESTER

[75] Inventors: Rene Nicolet; Walter Gutmann, both of Fribourg, Switzerland

[73] Assignee: Lonza Ltd., Gampel/Valais, Switzerland

[22] Filed: June 8, 1973

[21] Appl. No.: 368,100

[30] Foreign Application Priority Data
June 8, 1972  Switzerland.......................... 8491/72

[52] U.S. Cl........ 260/884; 260/23 AR; 260/23 XA; 260/23 S; 260/878; 260/885; 260/886
[51] Int. Cl...................... C08f 15/00; C08f 19/00
[58] Field of Search..................................... 260/884

[56] References Cited
UNITED STATES PATENTS

| | | | |
|---|---|---|---|
| 2,862,912 | 12/1958 | Ott................................. | 260/78.5 R |
| 2,899,405 | 8/1959 | Coover............................. | 260/45.5 |
| 3,334,156 | 8/1967 | Calentine et al.................... | 260/884 |
| 3,548,034 | 12/1970 | Cleeman et al..................... | 260/884 |
| 3,776,982 | 12/1973 | Nicolet et al...................... | 260/884 |

*Primary Examiner*—Murray Tillman
*Assistant Examiner*—Richard B. Turer
*Attorney, Agent, or Firm*—Christen & Sabol

[57] ABSTRACT

A process for the production of transparent impact-resistant and weather-resistant polymers of vinyl chloride by polymerizing vinyl chloride, possibly together with other copolymerizable monomers, in an aqueous dispersion according to the emulsion polymerization process in the presence of copolymers of acrylic acid esters. Vinyl chloride or monomer mixtures containing at least 80 percent by weight of vinyl chloride are polymerized in the presence of a dispersion of at least one copolymer of 65 to 95 percent by weight of at least one acrylic acid ester containing 3 to 18 carbon atoms in the ester group with 35 to 5 weight percent by weight of α-methyl styrene, the copolymer having a mean particle diameter of 30 to less than 120 mu, determined by soap titration, and being used in such an amount that the final polymer contains 4 to 20 percent by weight of acrylic acid ester units.

16 Claims, No Drawings

EMULSION POLYMERIZATION OF VINYL CHLORIDE, AND A COPOLYMER OF α-METHYL STYRENE AND ACRYLIC ACID ESTER

The invention relates to a process for the production of transparent impact-resistant and weather-resistant polymers of vinyl chloride by the polymerisation of vinyl chloride, possibly together with other copolymerisable monomers, according to the emulsion polymerisation process in an aqueous dispersion in the presence of copolymers of acrylic acid esters.

It is known (Belgian Patent No. 770,011) to produce polymers of vinyl chloride by the polymerisation of vinyl chloride according to the emulsion polymerisation process in the presence of 2 to 10 per cent by weight of a polymer of 2-ethyl-hexyl acrylate. Compared with the products of the previous state of the art, the products obtained in this way have an increased impact strength and improved transparency.

It has now been found that polymers of vinyl chloride which have a high impact strength and at the same time an improved transparency and which may also be easier to process can be obtained by using a prepolymer consisting of a copolymer of acrylate acid ester with α-methyl-styrene.

The process of the invention is characterised in that vinyl chloride or monomer mixture containing at least 80 per cent by weight of vinyl chloride, are polymerized in the presence of a dispersion of at least one copolymer of 65 to 95 per cent by weight of at least one acrylic acid ester containing 3 to 18 carbon atoms in the ester group with 35 to 5 per cent by weight of α-methyl-styrene, the copolymer having a mean particle diameter of 30 to 150 m$\mu$, preferably 40 to less than 120 m$\mu$ (determined by soap titration) and being used in such an amount that the final polymer contains 4 to 20 per cent by weight of acrylic acid ester units.

The copolymers of acrylic acid esters with α-methyl-styrene preferably used consist of 70 to 85 per cent by weight of at least one acrylic acid ester containing 3 to 18 carbon atoms preferably 4 to 8 carbon atoms, in the ester group with 30 to 15 per cent by weight of α-methyl-styrene. The acrylic ester component in the copolymer may consist of only one acrylic acid ester or of several different acrylic acid esters. Acrylic acid esters of this kind are, for example, the propyl, isopropyl, butyl, isobutyl, hexyl, 2-ethyl-hexyl, lauryl, myristyl, stearyl acrylates. Copolymers containing at least 90 per cent by weight 2-ethyl-hexyl acrylate are preferred.

The amount of copolymers of acrylic acid esters used is such that the final product contains 4 to 20, preferably 5 to 10 per cent by weight of acrylic acid ester units. Within the limits of the invention the amount depends upon the nature of the acrylic acid ester, the polymerisation temperature, the particle size and the desired notched impact strength and transparency.

The copolymers of acrylic acid ester with α-methyl-styrene used for the process of the invention are applied in the form of aqueous dispersions. They can be prepared by emulsion polymerisation of the starting monomers in the presence of water-soluble initiators and emulsifiers. The mean particles diameter of the resultant copolymers is determined in known manner by the conditions of the emulsion polymerisation.

Copolymer dispersions of varying mean particle diameter can be prepared, for example, by varying the amount of emulsifier. Suitable emulsifiers are primarily salts of fatty acids with a chain length of 12 to 18 carbon atoms. The alkali metal or ammonium salts of lauric acid, myristic acid, oleic acid, coconut fatty acid, palmitic acid, stearic acid, and others are preferably used. These emulsifiers are expediently used in amount of 2 to 12 per cent by weight, referred to the monomeric acrylate.

Another possibility of influencing the particle diameter of the copolymers consists in the method of adding the monomers and/or emulsifier. It is known, for example, that coarser dispersions are obtained when only part of the total amount of emulsifier is used at the start, the remainder being added in the course of the reaction.

If copolymer dispersions with coarser mean particle diameters are desired, the copolymerisation of acrylic acid esters with α-methyl-styrene can be carried out in the presence of a preformed latex of an acrylic acid ester homo- or copolymer. In this case, the polymerisation conditions are chosen in such a way that the polymerisation particles used at the start continue to grow without new particles being formed.

In principle, the mean particle diameter can be determined with the aid of various methods, such as scattered light measuring, with the aid of a disc centrifuge or by electron microscopy. In the last mentioned case there is a risk that due to their low softening point, the polymer particles may change by agglomeration or melting during the preparation of the sample or during measuring to such an extent that a reliable determination is no longer possible.

Soap titration has proved particularly suitable because of its simplicity. This method is known and has been applied by several authors (Houben-Weyl XIV/L, p.369). It is based on the determination of the specific particle surface of the dispersion being examined. If $d$ is the mean particle diameter in m$\mu$ and E is the amount of emulsifier required to cover 1 g of the polymer with a monomolecular emulsifier layer and if the density of the polyacrylate or acrylic acid ester copolymer is assumed to be 1.00, then the relation $$d = \frac{9.4}{E}$$

results for the titration with mersolate K 30 [according to Jacobi, Angew. Chemie 64, 539 – 543 (1962)].

The polymerisation of the vinyl chloride (graft), possibly together with other copolymerisable monomers, is carried out in an aqueous emulsion, preferably at temperatures of 50 to 70°C. Suitable copolymerisable monomers which can be used together with the vinyl chloride are primarily α-olefines, for example, ethylene, propylene, 1-butylene; unsaturated carboxylic acid esters, mainly vinyl esters such as vinyl acetate, vinyl propionate vinyl laurate, vinyl stearate and others; furthermore acrylic acid esters with 1 – 18 carbon atoms in the alkyl group; or maleic or fumaric acid diesters with 1 – 12 carbon atoms in the alkyl group; unsaturated ethers such as alkyl vinyl ethers, e.g., the methyl-, ethyl-, butyl-, isobutyl-, lauryl-, cetyl-, stearyl-vinyl ethers or isopropenyl-methyl or -ethyl ether. The α-olefin and the unsaturated carboxylic acid esters are preferably used in amounts of 3 – 20 per cent by weight, the unsaturated ethers in amounts of 1 – 15 per cent by weight.

As emulsifiers, anion-active emulsifiers are mainly used such as, for example, carboxylic acid salts, alkyl sulphates, alkyl- or aryl-alkyl sulphonates. Salts of fatty acids with a chain length of 12 – 18 carbon atoms, primarily the alkali metal or ammonium salts of lauric acid, myristic acid, oleic acid, coconut fatty acid, palmitic acid, stearic acid, and others are preferred. These emulsifiers are expediently used in amounts of 0.05 to 1%, referred to the monomers.

As catalysts, water-soluble radical formers are used, such as peroxides, persulphates, azo compounds, redox compounds. The advantageous amount is about 0.05 to 0.5 per cent by weight, referred to vinyl chloride.

The polymerisation can be carried out in the presence of polymerisation regulators. Mercaptans and saturated or unsaturated halogenated hydrocarbons are used as polymerisation regulators. The amount of regulator to be used depends on its type and the K-value to be adjusted. Dodecyl mercaptan, for example, is used in amounts of 0.01 to 0.2 per cent by weight, referred to the vinyl chloride. Trichloroethylene, 1,2-dichloroethylene or bromoform are used in amounts of 0.1% to 5%. The K-value of the resultant vinyl chloride polymers should preferably amount to about 60 to 75.

The polymerisation is carried out by placing the aqueous dispersion of the acrylic acid ester copolymer together with the catalyst, the emulsifier and possibly the regulator in a pressure vessel permitting of mixing, e.g. a pressure vessel fitted with stirrer; adding the monomeric vinyl chloride, possibly together with other copolymerisable monomers; and polymerising at the given temperature.

The process of the invention can be carried out in such a manner that the working pressure amounts to 65 to 99%, preferably 75 to 99%, of the saturation pressure of the vinyl chloride or of the monomer mixture at the corresponding polymerisation temperature. The monomeric vinyl chloride is partly dissolved in the aqueous phase, partly absorbed in the polymer already formed, and the last part is in the gaseous state, but it is never present in the reaction chamber in the liquid state.

The working pressure can be maintained by a continuous or almost continuous supply of vinyl chloride as it is consumed by the polymerisation.

This supply of vinyl chloride can be carried out, for example, by providing a communication between the gas area of the polymerisation vessel and the gas area of a storage tank wherein monomeric vinyl chloride, possibly after the addition of a non-volatile polymerisation inhibitor, is kept at such a temperature that the resultant pressure is exactly sufficient to balance the prescribed working pressure in the reaction chamber. The vinyl chloride can also be continuously added by pumping; in a preferred embodiment of the invention, liquid vinyl chloride is added in portions which are so small that the pressure in the reaction chamber remains almost constant, that is to say that it virtually deviates by less than 0.2 atm. excess pressure from the prescribed value. Due to the vacuum prevailing in the reaction chamber, the added liquid vinyl chloride will immediately evaporate when it arrives in the reaction chamber so that no vinyl chloride in liquid form can reach the polymerisation centres.

The monomers which can be copolymerised with the vinyl chloride may be added either in the form of a mixture with the vinyl chloride or separately. In the last-mentioned case the whole amount may be added from the start, or only part may be added at the start while the remainder is added continuously or in portions in the course of the polymerisation.

When the polymerisation is completed, the polymer is worked up in known manner, for example, by coagulation with the addition of electrolytes; separation from the polymerisation serum by centrifuging; washing; and drying in a drum drier or by spray drying or by spraying onto roller driers.

The polyvinyl chloride products obtained according to the invention showed throughout a better transparency and/or better impact strength than the corresponding products prepared according to conventional processes by polymerisation of the vinyl chloride in the presence of acrylic acid ester polymers without α-methyl styrene.

Compared with such conventional products, the polyvinyl chloride products obtained according to the invention either have the same notched impact strength and a haze which is about 50 to about 75% lower, or they have the same haze and notched impact strength values which may be two to five times as high.

According to a special embodiment of the invention, when the working pressure is below the saturation pressure of the vinyl chloride, as described above, there are moreover produced polymers which have the following additional and interesting properties. Although the K-values according to FIKENTSCHER are usually higher the torque values measured in the BRABENDER plastograph are lower or at most the same as those measured for the corresponding known products; this means that processing is easier because of the lower consumption of energy. Finally, plates produced from this material can be bent to and fro several times by 180° without showing any sign of white fracture.

Due to their excellent impact strength, transparency and weather resistance, the polymers according to the invention can be used for the production of transparent or translucent products such as plates, tubes, profiles etc., by extrusion, injection-moulding, calandering etc., and yield valuable building materials.

EXAMPLES

1. Preparation of the acrylic acid ester α-methyl-styrene copolymers (predispersion)

Desalted water, lauric acid (LS), sodium hydroxide solution and potassium persulphate (KPS) were heated in the amounts indicated in Table 1 in a stirrer of 12 litres capacity made of stainless steel to the polymerisation temperature of 55° and 70°C, respectively. After repeated evacuation and pressing in of nitrogen to rinse the stirrer, 2 atm. excess pressure nitrogen were finally pressed in. After the polymerisation temperature had been reached, 100 g of monomer mixture (predispersions A to K) were pumped within 2 minutes. After 10 minutes the remaining monomer was pumped in within 2 hours. After a reaction time of 4 hours, the pressure was released and the mixture cooled. The mean particle diameter was determined by soap titration with the emulsifier K 30 (BAYER).

The following Examples illustrate the preparation of vinyl chloride polymers in the presence of dispersions of acrylic acid ester/α-methyl-styrene copolymers according to Table 1.

Table 1

| predispersion | Water g | LS g | NaOH 10 n ml | KPS g | EHA g | BA g | αMS g | Temperature °C | mean particle diameter mμ | composition copolymer EHA | BA | αMS |
|---|---|---|---|---|---|---|---|---|---|---|---|---|
| A | 5900 | 60 | 30 | 5 | 1000 | | 100 | 55 | 40 | 90.9 | | 9.1 |
| B | 5700 | 60 | 30 | 5 | 1000 | | 200 | 55 | 46 | 83.3 | | 16.7 |
| C | 5600 | 60 | 30 | 5 | 1000 | | 300 | 70 | 40 | 76.9 | | 23.1 |
| D | 5900 | 60 | 30 | 5 | 1000 | | 350 | 70 | 45 | 74.1 | | 25.9 |
| E | 5650 | 30 | 15 | 5 | 1000 | | 300 | 70 | 68 | 76.9 | | 23.1 |
| F | 5650 | 30 | 15 | 5 | | 1000 | 300 | 70 | 58 | | 76.9 | 23.1 |
| G | 5660 | 22 | 11 | 5 | | 1000 | 300 | 70 | 96 | | 76.9 | 23.1 |
| H | 5670 | 18 | 9 | 5 | | 1000 | 300 | 70 | 117 | | 76.9 | 23.1 |
| J | 5680 | 15 | 8 | 8 | | 1000 | 300 | 70 | 143 | | 76.9 | 23.1 |
| K | 5650 | 30 | 15 | 5 | 600 | 400 | 300 | 70 | 61 | 46.2 | 32.7 | 23.1 |
| V | 6000 | 60 | 30 | 5 | 1000 | | | 55 | 43 | 100.0 | | |
| W | 5950 | 30 | 15 | 5 | 1000 | | | 70 | 60 | 100.0 | | |

LS = lauric acid
BA = n-butyl acrylate
KPS = potassium peroxide disulphate
EHA = ethyl-hexyl acrylate
αMS = α-methyl-styrene 2. Desalted water, lauric acid, a sodium hydroxide solution and potassium peroxide disulphate were placed in the amounts indicated in Table 2 in a stirrer autoclave of 12 litres capacity made of stainless steel and the mixture was heated to the polymerisation temperature of 59°C. During heating, the corresponding dispersion of the ethyl-hexyl acrylate/α-methyl-styrene copolymer (predispersion) was added (amount according to Table 2). The autoclave was then evacuated and rinsed by repeatedly pressing in vinyl chloride and releasing. After the polymerisation temperature has been reached, the stated amount of vinyl chloride was pressed in. The mixture was allowed to react until the pressure was 4 atm. excess pressure, then released and cooled. The dispersion contained 23 – 25 per cent by weight of solids. The polymer was isolated in the usual way by coagulation with electrolytes.

For comparison, vinyl chloride was polymerised in the presence of dispersions of ethyl-hexyl acrylate homopolymer (experiments Nos. 5, 12, 13, 14) and without a dispersion of acrylic acid ester polymers (experiment No. 6).

Plates of 1 mm and 4 mm thickness were produced by rolling mixtures of 60.5 per cent by weight of vinyl chloride polymer, 1 part by weight of an organic thiotin stabiliser and 1 part by weight of a lubricant for 10 minutes at 180°C on mixing rollers and pressing at 180°C. The notched impact strength of small standard rods was measured according to DIN 53453, the VICAT softening point according to DIN 53460. The haze was measured with the aid of the haze-meter manufactured by the firm Evans Electroselenium Ltd., of Halstead (England), according to ASTM D 1003-61. The term "haze" or cloudiness refers to the relation between the light $Td$ which is scattered when it passes through the sample, and the light $Tt$ which is transmitted unscattered. The value is given as a percentage:

$$\text{haze} = \frac{Td}{Tt} \cdot 100 \, (\%).$$

In order to test the processing properties, a mixture of 57 parts by weight vinyl chloride polymer, 2.3 parts by weight of barium/cadmium stabiliser and 0.7 parts by weight of a lubricant were kneaded in a measuring kneader type 50 of a plastograph type P1 3 S of the firm BRABENDER, of Duisburg (Germany), at 180°C and 40 r.p.m. The lowest torque in kpm which was reached after gelling and depends upon the melting viscosity of the material was taken as a measure for the processibility.

The results are listed in Table 2.

Table 2

| experiment No. | predispersion No. | predispersion particle diameter mμ | predispersion g | water g | LS g | NaOH 1 n ml | KPS g | VC g | Temperature °C |
|---|---|---|---|---|---|---|---|---|---|
| 01 | A | 40 | 710 | 5360 | 6 | 35 | 5 | 1900 | 59 |
| 02 | B | 46 | 700 | 5380 | 6 | 35 | 2 | 1880 | 59 |
| 03 | C | 40 | 700 | 5400 | 6 | 35 | 2 | 1870 | 59 |
| 04 | D | 45 | 735 | 5360 | 6 | 35 | 2 | 1870 | 59 |
| 05 | V | 43 | 700 | 5350 | 6 | 35 | 4 | 1900 | 59 |
| 06 | — | — | 0 | 6000 | 12 | 60 | 6 | 2000 | 59 |
| 07 | E | 68 | 560 | 5500 | 8 | 45 | 2 | 1900 | 59 |
| 08 | E | 68 | 700 | 5400 | 6 | 35 | 2 | 1870 | 59 |
| 09 | E | 68 | 980 | 5150 | 8 | 45 | 2 | 1820 | 59 |
| 10 | E | 68 | 1190 | 5000 | 8 | 45 | 2 | 1780 | 59 |
| 12 | W | 60 | 560 | 5470 | 9 | 50 | 2 | 1900 | 59 |
| 13 | W | 60 | 700 | 5450 | 9 | 50 | 2 | 1900 | 59 |
| 14 | W | 60 | 910 | 5170 | 8 | 45 | 2 | 1870 | 59 |

LS = lauric acid
KPS = potassium peroxide disulphate

| experiment No. | content of EHA % | content of αMS % | K-value | haze 1 mm-plate % | Brabender-torque mkp | notched impact strength kpcm/squ.cm | Vicat °C |
|---|---|---|---|---|---|---|---|
| 01 | 5.7 | 0.6 | 68.5 | 10 | 3.4 | 9.8 | 75 |
| 02 | 5.8 | 1.2 | 71.1 | 7 | 3.4 | 15.2 | 74 |

Table 2 — Continued

| experiment No. | content of EHA % | content of αMS % | K-value | haze 1 mm-plate % | Brabender-torque mkp | notched impact strength kpcm/squ.cm | Vicat °C |
|---|---|---|---|---|---|---|---|
| 03 | 6.0 | 1.8 | 68.7 | 4 | 3.4 | 8.7 | 75 |
| 04 | 6.4 | 2.1 | 67.6 | 3 | 3.4 | 8.8 | 75 |
| 05 | 5.6 | 0.0 | 67.4 | 16 | 3.2 | 8.8 | 75 |
| 06 | 0.0 | 0.0 | 65.0 | 4 | n.b. | 3.2 | 75 |
| 07 | 4.7 | 1.4 | 68.8 | 4 | 3.3 | 9.0 | 75 |
| 08 | 6.0 | 1.8 | 69.7 | 6 | 3.3 | 12.5 | 75 |
| 09 | 8.2 | 2.5 | 70.4 | 11 | 3.4 | 24.7 | 75 |
| 10 | 10.5 | 3.2 | 70.7 | 14 | 3.4 | 34.8 | 75 |
| 12 | 5.4 | 0.0 | 66.6 | 18 | 3.0 | 10.6 | 75 |
| 13 | 6.6 | 0.0 | 65.6 | 21 | 3.0 | 14.2 | 75 |
| 14 | 8.0 | 0.0 | 66.4 | 40 | 3.0 | 17.2 | 75 |

EHA = ethyl hexyl acrylate
αMS = α-methylstyrene

3. The experiments 07 and 08 according to the invention and the comparative experiments 12 and 13 of Example 2 were repeated, but at a polymerisation temperature of 53°C and 67°C instead of 59°C, or with the addition of about 1 per cent by weight of trichloroethylene (referred to vinyl chloride).

The polymerisation conditions and the results are listed in Table 3.

4. Vinly chloride was polymerised starting with dispersions of copolymers of acrylic acid n-butyl ester and α-methyl-styrene as in Example 2 at 59°C; the amounts used and the results are listed in Table 4.

Table 3

| experiment No. | predispersion No. | predispersion particle diameter mμ | g | water g | LS g | NaOH 1 n ml | KPS g | tri g | VC g | Temperature °C |
|---|---|---|---|---|---|---|---|---|---|---|
| 15 | E | 68 | 560 | 5450 | 9 | 50 | 2 |  | 1900 | 53 |
| 16 | E | 68 | 700 | 5400 | 9 | 50 | 2 |  | 1870 | 53 |
| 17 | W | 60 | 700 | 5550 | 9 | 50 | 2 |  | 1900 | 53 |
| 18 | E | 68 | 560 | 5450 | 9 | 50 | 1 |  | 1900 | 67 |
| 19 | E | 68 | 700 | 5380 | 9 | 50 | 2 |  | 1870 | 67 |
| 20 | W | 60 | 700 | 5550 | 9 | 50 | 2 |  | 1900 | 67 |
| 21 | E | 68 | 560 | 5400 | 9 | 50 | 2 | 20 | 1900 | 59 |
| 22 | E | 68 | 700 | 5370 | 9 | 50 | 2 | 20 | 1870 | 59 |
| 23 | W | 60 | 560 | 5470 | 10 | 55 | 2 | 20 | 1920 | 59 |
| 24 | W | 60 | 700 | 5550 | 9 | 50 | 2 | 20 | 1900 | 59 |

LS = lauric acid
KPS = potassium peroxide disulphate
Tri = trichloroethylene

| experiment No. | content of EHA % | content of αMS % | K-value | haze 1 mm-plate % | Brabender torque mkp | notched impact strength kpcm/sq.cm | Vicat °C |
|---|---|---|---|---|---|---|---|
| 15 | 5.0 | 1.5 | 74.2 | 3 | 3.6 | 11.6 | 75 |
| 16 | 5.9 | 1.8 | 73.1 | 4 | 3.5 | 13.6 | 75 |
| 17 | 6.1 | 0.0 | 71.4 | 18 | 3.5 | 15.4 | 76 |
| 18 | 4.6 | 1.4 | 63.4 | 4 | 2.5 | 4.5 | 75 |
| 19 | 6.2 | 1.9 | 64.2 | 6 | 2.5 | 6.7 | 73 |
| 20 | 5.9 | 0.0 | 59.7 | 26 | 2.5 | 8.6 | 74 |
| 21 | 4.9 | 1.5 | 61.6 | 5 | 2.3 | 4.5 | 74 |
| 22 | 6.0 | 1.8 | 62.9 | 7 | 2.4 | 5.0 | 74 |
| 23 | 5.1 | 0.0 | 58.2 | 25 | 2.4 | 4.1 | 74 |
| 24 | 6.0 | 0.0 | 59.2 | 38 | 2.5 | 6.6 | 74 |

EHA = ethyl hexyl acrylate
αMS = α-methyl-styrene

Table 4

| experiment No. | predispersion No. | predispersion particle diameter mμ | g | water g | LS g | NaOH 1 n ml | KPS g | VC g | Temperature °C |
|---|---|---|---|---|---|---|---|---|---|
| 31 | F | 58 | 700 | 5380 | 9 | 50 | 2 | 1870 | 59 |
| 32 | F | 58 | 910 | 5210 | 8 | 45 | 2 | 1830 | 59 |
| 33 | F | 58 | 1180 | 5000 | 7 | 40 | 2 | 1780 | 59 |
| 34 | F | 58 | 1960 | 4480 | 4 | 25 | 2 | 1640 | 59 |
| 35 | G | 96 | 560 | 5480 | 10 | 55 | 2 | 1900 | 59 |
| 36 | G | 96 | 700 | 5380 | 10 | 55 | 2 | 1870 | 59 |
| 37 | G | 96 | 910 | 5200 | 9 | 55 | 2 | 1830 | 59 |
| 38 | G | 96 | 1180 | 5000 | 8 | 45 | 2 | 1780 | 59 |
| 39 | H | 117 | 560 | 5490 | 10 | 55 | 2 | 1900 | 59 |
| 40 | H | 117 | 910 | 5210 | 9 | 50 | 2 | 1830 | 59 |
| 41 | H | 117 | 1190 | 5000 | 8 | 45 | 2 | 1780 | 59 |
| 42 | H | 117 | 1960 | 4480 | 4 | 25 | 2 | 1640 | 59 |

Table 4 — Continued

| experiment No. | predispersion No. | particle diameter mμ | g | water g | LS g | NaOH 1 n ml | KPS g | VC g | Temperature °C |
|---|---|---|---|---|---|---|---|---|---|
| 43 | J | 143 | 560 | 5490 | 10 | 55 | 2 | 1900 | 59 |
| 44 | J | 143 | 700 | 5380 | 8 | 45 | 2 | 1870 | 59 |
| 45 | J | 143 | 910 | 5210 | 9 | 50 | 2 | 1830 | 59 |
| 46 | J | 143 | 1190 | 5000 | 8 | 45 | 2 | 1780 | 59 |

LS = lauric acid
KPS = potassium peroxide disulphate

| experiment No. | content of BA | αMS | K-value | haze 1 mm-plate % | Brabender torque mkp | notched impact strength kpcm/squ.cm | Vicat |
|---|---|---|---|---|---|---|---|
| 31 | 5.9 | 1.7 | 70.6 | 3 | 3.4 | 4.2 | 74 |
| 32 | 7.7 | 2.3 | 70.9 | 3 | 3.2 | 5.1 | 74 |
| 33 | 9.6 | 2.9 | 72.4 | 4 | 3.3 | 7.3 | 74 |
| 34 | 17.1 | 5.1 | 74.8 | 10 | 3.2 | 48.0 | 67 |
| 35 | 5.8 | 1.7 | 68.7 | 3 | 3.1 | 4.5 | 75 |
| 36 | 6.5 | 1.9 | 68.8 | 3 | 3.1 | 7.0 | 74 |
| 37 | 7.5 | 2.2 | 70.2 | 5 | 3.2 | 7.9 | 74 |
| 38 | 10.1 | 3.0 | 71.2 | 10 | 3.2 | 19.7 | 73 |
| 39 | 5.3 | 1.6 | 68.1 | 4 | 2.9 | 7.8 | 74 |
| 40 | 7.7 | 2.3 | 70.9 | 8 | 3.0 | 13.1 | 73 |
| 41 | 9.9 | 3.0 | 71.4 | 14 | 2.9 | 27.0 | 73 |
| 42 | 15.9 | 4.8 | 79.3 | 19 | 2.8 | 50.5 | 67 |
| 43 | 4.9 | 1.4 | 67.9 | 7 | 2.9 | 9.8 | 75 |
| 44 | 6.4 | 1.9 | 68.5 | 9 | 2.9 | 12.6 | 74 |
| 45 | 7.4 | 2.2 | 68.7 | 10 | 2.9 | 18.0 | 73 |
| 46 | 9.6 | 2.9 | 70.7 | 12 | 2.8 | 29.0 | 72 |

BA = n-butyl acrylate
αMS = α-methyl-styrene

5. The experiments of Example 4 were repeated but with a dispersion of a copolymer of about 31 per cent by weight of n-butyl acrylate, about 46 per cent by weight of 2-ethyl hexyl acrylate and about 23 per cent by weight of α-methyl-styrene. The amounts used and the results are listed in Table 5.

Table 5

| experiment No. | predispersion No. | particle diameter mμ | g | water g | LS g | NaOH 1 n ml | KPS g | VC g | Temperature °C |
|---|---|---|---|---|---|---|---|---|---|
| 51 | K | 61 | 560 | 5480 | 10 | 55 | 2 | 1900 | 59 |
| 52 | k | 61 | 700 | 5380 | 9 | 50 | 2 | 1870 | 59 |
| 53 | K | 61 | 910 | 5210 | 8 | 45 | 2 | 1830 | 59 |
| 54 | K | 61 | 1180 | 5000 | 7 | 40 | 2 | 1780 | 59 |
| 55 | K | 61 | 1960 | 4480 | 4 | 25 | 2 | 1640 | 59 |

LS = lauric acid
KPS = potassium peroxide disulphate

| experiment No. | content of EHA % | BA % | αMS % | K-value | haze 1 mm-plate % | Brabender torque mkp | notched impact strength kpcm/squ.cm | Vicat °C |
|---|---|---|---|---|---|---|---|---|
| 51 | 3.1 | 2.1 | 1.5 | 69.0 | 3 | 3.1 | 6.7 | 75 |
| 52 | 3.7 | 2.5 | 1.8 | 69.4 | 4 | 3.1 | 10.6 | 75 |
| 53 | 4.4 | 3.0 | 2.2 | 69.5 | 6 | 3.1 | 13.7 | 75 |
| 54 | 5.7 | 3.8 | 2.9 | 71.2 | 8 | 3.1 | 18.9 | 74 |
| 55 | 10.9 | 7.3 | 5.5 | 74.0 | 14 | 2.9 | 48.0 | 68 |

EHA = ethyl hexyl acrylate
αMS = α-methyl-styrene
BA = n-butyl acrylate 6. 5280 g of desalted water, 6 g lauric acid, 35 ml of a normal sodium hydroxide solution, 5 g potassium peroxide disulphate and 700 g of the dispersion B of Example 1 were introduced with stirring at 50°C into a stirrer autoclave of 12 litres capacity made of stainless steel. The autoclave was evacuated and rinsed by repeatedly pressing in vinyl chloride and releasing, and then heated to 59°C. At the autoclave temperature of 59°C vinyl chloride was added in such an amount that the pressure amounted to 8.0 atm. excess pressure. More vinyl chloride was pumped in at an almost constant pressure in portions of 10 to 20 g as it was consumed.

After consumption of a total of 1900 g vinyl chloride, the reaction was allowed to continue until the pressure was about 4 atm. excess pressure, the unreacted vinyl chloride was released and cooled. The polymer was isolated in the usual way by precipitation with electrolytes.

Compared with a polymer prepared with the same mixture but with the addition of the total amount of vinyl chloride right at the start of the polymerisation, i.e. at the saturation pressure of the vinyl chloride (about 9.1 atm. excess pressure), the following results were found:

| Experiment No. | 61 | 02 |
|---|---|---|
| polymerisation pressure, atm. exc.press. | 8.0 | 9.1 |
| content of 2-ethyl-hexyl acrylate % | 6.1 | 5.8 |
| content of α-methyl-styrene, % | 1.2 | 1.2 |
| K-value | 73.3 | 71.1 |
| BRABENDER torque value, mkp | 2.7 | 3.4 |
| haze, 1 mm-plate, % | 4 | 7 |
| notched impact strength, kpcm/sq.cm. | 12.9 | 15.2 |
| VICAT, °C | 72 | 74 |

What is claimed is:

1. A process for the production of transparent impact-resistant and weather-resistant polymers of vinyl chloride by polymerizing vinyl chloride, optionally together with other copolymerisable monomers, in an aqueous dispersion by an emulsion polymerisation process in the presence of copolymers of acrylic acid esters, characterised in that vinyl chloride or monomer mixtures containing at least 80 percent by weight of vinyl chloride are polymerised in the presence of a dispersion of at least one copolymer of 65 to 95 percent by weight of at least one acrylic acid ester containing 3 to 18 carbon atoms in the ester group with 35 to 5 percent by weight of α-methyl styrene, the copolymer having a mean particle diameter of 30 to less than 120 mμ, determined by soap titration, and being used in such an amount that the final polymer contains 4 to 20 percent by weight of acrylic acid ester units.

2. A process according to claim 1, characterised in that the amounts of copolymers of acrylic acid esters used are such that the final polymer contains 5 to 10 percent by weight of acrylic acid ester units.

3. A process according to claim 1, characterised in that copolymers of 70 to 85 percent by weight of at least one acrylic acid ester containing 3 to 18 carbon atoms in the ester group with 30 to 15 percent by weight of α-methyl-styrene are used as copolymers of acrylic acid ester.

4. A process according to claim 1, characterised by the use of copolymers of acrylic acid esters containing at least one acrylic acid ester with 4 to 8 carbon atoms in the ester group as the acrylic acid ester component.

5. A process according to claim 1, characterised by the use of copolymers of acrylic acid esters which are synthesized from two different acrylic acid esters and α-methyl-styrene.

6. A process according to claim 1, characterised by the use of copolymers of acrylic acid esters containing at least 90 percent by weight of 2-ethyl-hexyl acrylate as acrylic acid ester component.

7. A process according to claim 1, characterised in that the emulsion polymerisation of vinyl chloride or of the monomer mixture is carried out at temperatures of 50° to 70° C.

8. process according processaccording to claim 1, characterised by the polymerisation of a monomer mixture of 80 to 97 percent by weight of vinyl chloride and 20 to 3 percent by weight of α-olefins.

9. A process according to claim 1, characterised by the polymerisation of a monomer mixture of 80 to 97 percent by weight of vinyl chloride and 20 to 3 percent by weight of an unsaturated carboxylic acid ester.

10. A process according to claim 1, characterised by the polymerisation of a monomer mixture of 85 to 99 percent by weight of vinyl chloride and 15 to 1 percent by weight of alkyl vinyl ether.

11. A process according to claim 1, characterised in that the polymerization is carried out in the presence of salts of fatty acids with 12 to 18 atoms in the molecule used as emulsifiers in amounts of 0.05 to 1 percent by weight, based upon the vinyl chloride.

12. A process according to claim 1, characterised in that the polymerisation is carried out in the presence of polymerisation regulators.

13. A process according to claim 1, characterised in that it is carried out in the presence of mercaptans used as regulators in amounts of 0.01 to 0.2 percent by weight, based upon the vinyl chloride.

14. A process according to claim 1 characterised in that it is carried out in the presence of saturated and/or unsaturated halogenated hydrocarbons used as regulators in amounts of 0.1 to 5 percent by weight, referred to vinyl chloride.

15. A process according to claim 1, characterised by the use of water-soluble free radical catalysts.

16. Process according to claim 1, characterised in that the polymerisation is carried out at absolute pressures amounting to 65 to 99% of the saturation pressure of vinyl chloride or of the monomer mixture at the corresponding polymerisation temperature, and under the conditions of emulsion polymerisation.

* * * * *